US009906392B2

(12) United States Patent
Hwang et al.

(10) Patent No.: US 9,906,392 B2
(45) Date of Patent: Feb. 27, 2018

(54) METHOD AND APPARATUS FOR PROCESSING TRANSMISSION SIGNAL FOR PAPR REDUCTION IN TIME REGION

(71) Applicant: ELECTRONICS AND TELECOMMUNICATIONS RESEARCH INSTITUTE, Daejeon (KR)

(72) Inventors: Hyun Gu Hwang, Daejeon (KR); Gi Yoon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 95 days.

(21) Appl. No.: 15/008,150

(22) Filed: Jan. 27, 2016

(65) Prior Publication Data

US 2016/0218904 A1 Jul. 28, 2016

(30) Foreign Application Priority Data

Jan. 27, 2015 (KR) .................. 10-2015-0012949

(51) Int. Cl.
*H04L 27/26* (2006.01)

(52) U.S. Cl.
CPC .............................. *H04L 27/2623* (2013.01)

(58) Field of Classification Search
CPC ............. H04L 27/2614; H04L 27/2615; H04L 27/2617; H04L 27/2623; H04L 27/2624
See application file for complete search history.

(56) References Cited

U.S. PATENT DOCUMENTS

| 6,985,539 B2* | 1/2006 | Kaku | H04L 27/2624 |
| | | | 332/123 |
| 2004/0109492 A1* | 6/2004 | Viero | H04B 1/70755 |
| | | | 375/130 |
| 2005/0089116 A1* | 4/2005 | Moffatt | H04L 27/2614 |
| | | | 375/295 |
| 2008/0002779 A1* | 1/2008 | Carsello | H04L 27/2624 |
| | | | 375/260 |
| 2008/0219372 A1* | 9/2008 | Hori | H04L 27/2614 |
| | | | 375/261 |
| 2010/0027690 A1* | 2/2010 | Liang | H04L 27/2614 |
| | | | 375/260 |
| 2010/0272221 A1* | 10/2010 | Walker | H04B 1/0475 |
| | | | 375/346 |
| 2010/0321237 A1* | 12/2010 | Na | H04B 7/086 |
| | | | 342/373 |

(Continued)

FOREIGN PATENT DOCUMENTS

| JP | 2014-175818 A | 9/2014 |
| KR | 10-2011-0087115 A | 8/2011 |

(Continued)

*Primary Examiner* — Hoang-Chuong Q Vu
(74) *Attorney, Agent, or Firm* — NSIP Law

(57) ABSTRACT

Provided are a method and an apparatus for processing a transmission signal, which reduce a peak value to an appropriate magnitude by appropriately distorting a final transmission signal through implementation into simple hardware having a small memory and a small operation amount to effectively reduce a peak-to-average power ratio (PAPR) by effectively processing a signal for wireless communication in real time.

8 Claims, 7 Drawing Sheets

(56) References Cited

U.S. PATENT DOCUMENTS

| | | | |
|---|---|---|---|
| 2011/0182339 A1 | 7/2011 | Kang et al. | |
| 2013/0230121 A1 | 9/2013 | Molko et al. | |
| 2013/0251055 A1 | 9/2013 | Yu et al. | |
| 2013/0259160 A1 | 10/2013 | Lim | |
| 2013/0315320 A1* | 11/2013 | McGowan | H04L 27/2614 375/260 |
| 2014/0044215 A1* | 2/2014 | Mundarath | H04L 27/2624 375/297 |
| 2014/0254718 A1 | 9/2014 | Hori et al. | |

FOREIGN PATENT DOCUMENTS

| | | |
|---|---|---|
| KR | 10-2012-0121733 A | 11/2012 |
| KR | 10-2013-0106489 A | 9/2013 |

* cited by examiner

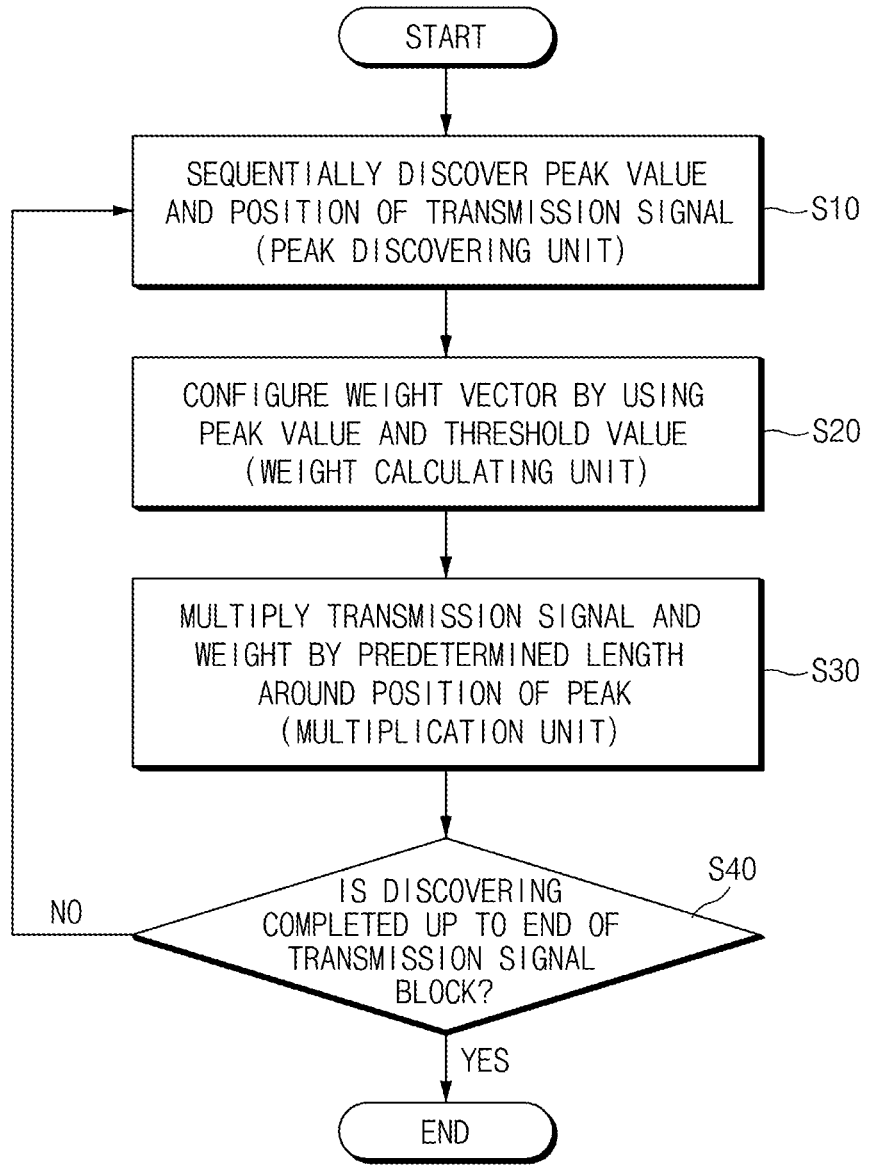

METHOD AND APPARATUS FOR PROCESSING TRANSMISSION SIGNAL FOR PAPR REDUCTION IN TIME REGION

CROSS-REFERENCE TO RELATED APPLICATIONS

This application claims priority to and the benefit of Korean Patent Application No. 10-2015-0012949 filed in the Korean Intellectual Property Office on Jan. 27, 2015, the entire contents of which are incorporated herein by reference.

TECHNICAL FIELD

The present invention relates to a method and an apparatus for processing a transmission signal, and particularly, to a method and an apparatus for processing a transmission signal, which reduce a peak value to an appropriate magnitude by appropriately distorting the transmission signal for wireless communication to reduce a peak-to-average power ratio (PAPR) in a time region.

BACKGROUND ART

In recent years, with the development of a wireless communication system, a scheme has been widely used, which maps a source signal to a frequency region and converts the mapped source signal to the frequency region into a time region signal again to generate a modulation signal like orthogonal frequency division multiplexing (OFDM) and a frequency modulation transmitter (FMT). At present, in a cellular system, long term evolution (LTE) technology has been commercialized by using the OFDM and a communication system such as terrestrial trunked radio (TETRA) has been commercialized by using the FMT.

However, a peak-to-average power ratio (PAPR) problem occurs while converting the signal of the frequency region into the signal of the time region as described above. In order to solve the problem, a large number of theses and patents of a method for reducing the PAPR of the modulation signal have been presented up to now. The method representatively includes a method using a partial transmit sequence (PTS), a method using clipping and filtering, and the like. The PAPR reducing methods have a disadvantage in that actual bandwidth efficiency is reduced by using an additional signal or hardware configuration is difficult and a calculation time is very long due to too many and complicated calculation. Alternatively, there are methods which are difficult to use in a general system because the method operates only in a particular system such as multiple input multiple output (MIMO).

SUMMARY OF THE INVENTION

The present invention has been made in an effort to provide a method and an apparatus for processing a transmission signal, which reduce a peak value to an appropriate magnitude by appropriately distorting a final transmission signal through implementation into simple hardware having a small memory and a small operation amount to effectively reduce a peak-to-average power ratio (PAPR) by effectively processing a signal for wireless communication in real time.

First, when a feature of the present invention is summarized, an exemplary embodiment of the present invention provides a method for processing a transmission signal in a time region in a transmitter for transmitting a signal for wireless communication including: detecting a position of a signal peak that exceeds a predetermined power threshold value and a corresponding power value with respect to a transmission target input signal; calculating a weight vector by using a power value p of the detected signal peak and the power threshold value t; and multiplexing the input signal by respective corresponding values of the weight vector around the position of the signal peak and outputting the input signal multiplied by the corresponding values. The method may further include repeating the detection of the position of the signal peak and the corresponding power value, the calculation of the weight vector, and the multiplication process with respect to subsequent signals after the input signal and the weight vector are multiplied by each other.

The weight vector may have a value for decreasing power at the position of the signal peak to the power threshold value t and a bilateral symmetric value between 0 and 1 around the position of the signal peak.

The weight vector w may include the following equation, $$w[i] = 1 - \left(1 - \sqrt{t/p}\right)\left(1 - \cos\left(\frac{2\pi i}{L-1}\right)\right) * 0.5,$$

$$i = 0, 1, \ldots, L-1$$

where, L represents the length of the weight vector.

The input signal may include signals such as orthogonal frequency division multiplexing (OFDM), a frequency modulation transmitter (FMT), and the like.

Another exemplary embodiment of the present invention provides a transmitter for wireless communication including: a peak discovering unit detecting a position of a signal peak that exceeds a predetermined power threshold value and a corresponding power value with respect to a transmission target input signal; a weight calculating unit calculating a weight vector by using a power value p of the detected signal peak and the power threshold value t; and a multiplication unit multiplexing the input signal by respective corresponding values of the weight vector around the position of the signal peak and outputting the input signal multiplied by the corresponding values.

The detection of the position of the signal peak and the corresponding power value in the peak discovering unit, the calculation of the weight vector in the weight calculating unit, and the multiplication in the multiplication unit may be repeatedly performed with respect to subsequent signals after the input signal and the weight vector are multiplied by each other.

The weight vector may have a value for decreasing power at the position of the signal peak to the power threshold value t and a bilateral symmetric value between 0 and 1 around the position of the signal peak.

The weight vector w may include the following equation, $$w[i] = 1 - \left(1 - \sqrt{t/p}\right)\left(1 - \cos\left(\frac{2\pi i}{L-1}\right)\right) * 0.5,$$

$$i = 0, 1, \ldots, L-1$$

where, L represents the length of the weight vector.

The input signal may include signals such as orthogonal frequency division multiplexing (OFDM), a frequency modulation transmitter (FMT), and the like.

According to exemplary embodiments of the present invention, in a method and an apparatus for processing a transmission signal for PAPR reduction in a time region, since a method is used, which reduces a peak value to an appropriate magnitude by appropriately distorting a final transmission signal for wireless communication just by using only a position of a subpeak over threshold power and a peak value, the present invention can be implemented by simple hardware having a small memory and a small operation amount and a signal can be effectively processed in real time and complicated hardware for processing a clipped signal itself or an error signal generated by clipping like the existing schemes is not required.

Since a clipping scheme is not used in spite of operation in the time region, there is no filtering block and since the present invention can be applied to a final output signal in the time region, the present invention can be applied regardless of a modulation scheme and the present invention may be used while being mixed with another PAPR technique for signal processing in a frequency region, and the like, and as a result, the present invention can be applied to almost all systems.

An influence of performance deterioration is almost never exerted on even demodulation performance and out-of-band emission can be sufficiently decreased by increasing a weight length, and as a result, there is small influence on occurrence of spurious in another band.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

BRIEF DESCRIPTION OF THE DRAWINGS

FIG. 2 is a signal processing flowchart in a method for processing a transmission signal for PAPR reduction in a time region according to an exemplary embodiment of the present invention.

Figure 1:
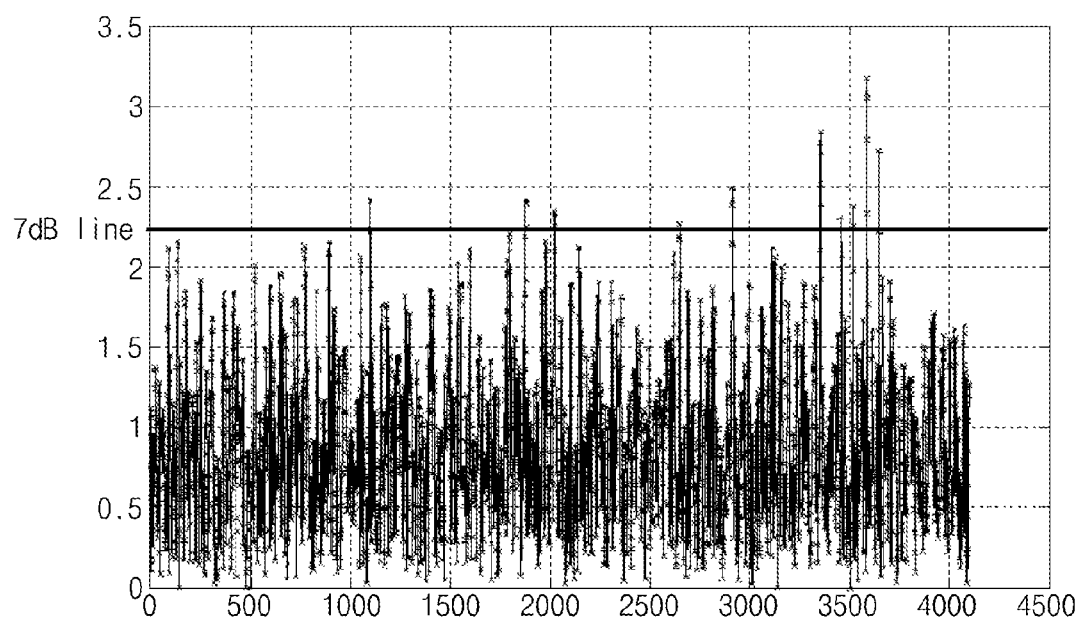
FIG. 1 is an exemplary diagram of a general OFDM signal.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail with reference to the accompanying drawings. In this case, like reference numerals refer to like elements in the respective drawings. Further, a detailed description of an already known function and/or configuration will be skipped. In contents disclosed hereinbelow, a part required for understanding an operation according to various exemplary embodiments will be described in priority and a description of elements which may obscure the gist of the present invention will be skipped. Further, some components of the drawings may be enlarged, omitted, or schematically illustrated. An actual size is not fully reflected on the size of each component and therefore, contents disclosed herein are not limited by relative sizes or intervals of the components drawn in the respective drawings.

FIG. 1 is an exemplary diagram of a general OFDM signal. In the example of a magnitude of the OFDM signal depending on a time illustrated in FIG. 1, the square of a signal magnitude is associated with power of a signal and an average value of the signal power is associated with the square (=1) of approximately 1 and a maximum value of the signal power is associated with the square (=10.093329) of approximately 3.177. In such an example, a difference between average power and peak power becomes approximately 10 times and herein, a PAPR becomes approximately 10 dB. As described above, in general, the OFDM signal generally has the PAPR of approximately 10 dB. A lot of theses and inventions have been made in order to reduce the PAPR.

Hereinafter, a method for reducing the PAPR in the time region by setting a target PAPR to a threshold value, 7 dB in processing the OFDM signal of a wireless communication method according to the exemplary embodiment of the present invention will be described with reference to FIGS. 2 to 7. In FIG. 1, when the target PAPR, 7 dB is set as the threshold value, the corresponding power threshold value is approximately 5.012 and the corresponding OFDM signal magnitude threshold value is approximately 2.239.

FIG. 2 is a signal processing flowchart in a method for processing a transmission signal for reducing a PAPR in a time region according to an exemplary embodiment of the present invention.

First, in a transmitter (e.g., a peak discovering unit) for transmitting the signal for wireless communication, such as the OFDM, FMT, or the like, a position of a signal peak that exceeds predetermined power threshold values (e.g., the PAPR of 7 dB, the power of approximately 5.012, and the signal magnitude of approximately 2.239) and the corresponding power values are detected with respect to an input signal (S10). As described below, by repeating steps S10 to S40, with respect to a transmission target OFDM signal block having a predetermined signal length, the position of the signal peak and the power value that exceed the predetermined power threshold values are sequentially detected in step S10. Steps S10 to S40 are similarly performed with respect to residual signals of the signal block.

In step S10, for example, in the example illustrated in FIG. 1, the positions of the signal peak and the power value are sequentially detected from a first peak among 10 peaks that exceed the target PAPR threshold value (e.g., the PAPR of 7 dB). In FIG. 1, the average value of the signal power is associated with the square of approximately 1, and as a result, since a value larger there than by 7 dB is the square of 2.239, that is, the power threshold value is 5.012, a signal of which power exceeds 5.012 is detected. In this case, when the number of signal peaks which exceed the power threshold value in a predetermined interval L is one, a position and a power value thereof may be immediately detected and when multiple signal peaks which consecutively exceed the power threshold value are detected, a position and a power value of a largest signal peak may be detected among the consecutive signal peaks. In the example of FIG. 1, a first peak which exceeds the target PAPR threshold value of 7 dB is an approximately 1100-th signal.

As described above, the position of the signal peak and the power value that exceed the detected power threshold value t and thereafter, a transmitter (e.g., a weight calculating unit) calculates a weight vector w[i] as shown in [Equation 1] by using the power value p of the corresponding signal peak position and the power threshold value t which are detected (S20). For example, when the detected power value p of the corresponding signal peak position is 5.837 (the square of the signal magnitude of 2.416), a ratio r becomes $(5.012/5.837)^{1/2}=0.927$.

$$w[i]=1-(1-r)*x[i], i=0,1,L-1$$

$$r=\sqrt{t/p} \quad \text{[Equation 1]}$$

A method for configuring the weight vector by using the ratio r may include various methods, but in the present invention, the weight vector w[i] is configured as below by using a temporary weight vector x[i] including a cosine function.

Figure 3A:
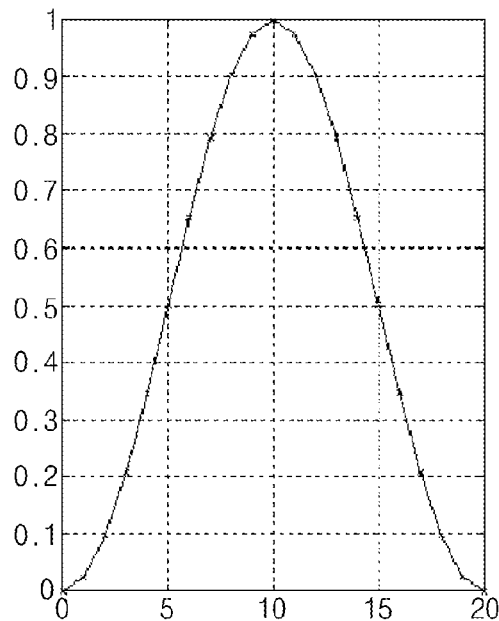
FIG. 3A, FIG. 3B, and FIG. 3C are exemplary diagrams of a weight function according to the exemplary embodiment of the present invention.
Figure 3B:
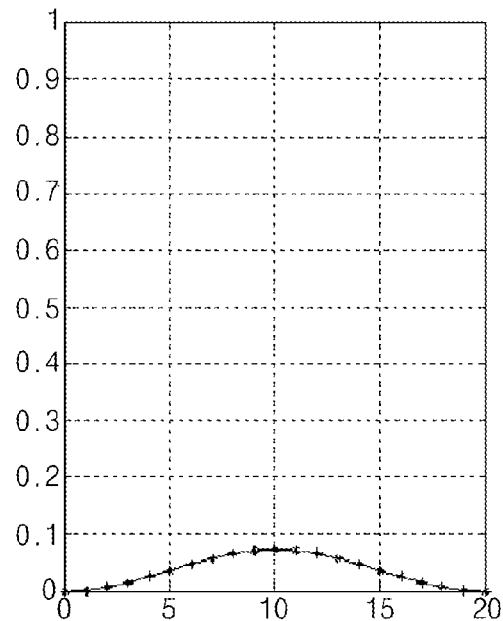
Figure 3C:
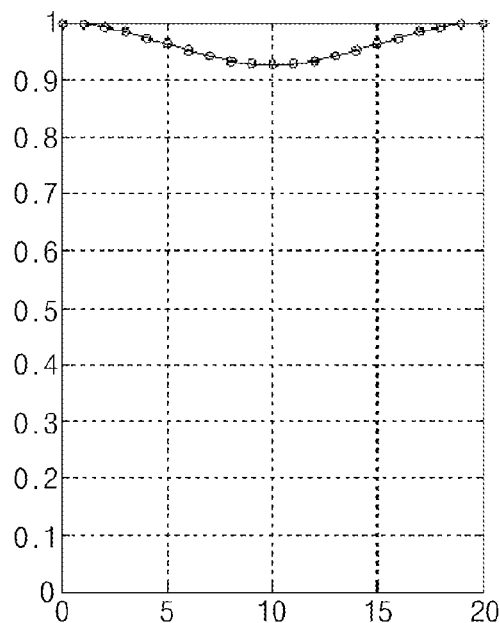

FIG. 3A, FIG. 3B, and FIG. 3C are exemplary diagrams of a weight function according to the exemplary embodiment of the present invention.

First, the temporary weight vector x[i] includes the cosine function as shown in [Equation 2] and may be expressed as a graph depending on the time as illustrated in FIG. 3A. Herein, a time length L of the vector may be previously designated and in FIG. 3A, FIG. 3B, and FIG. 3C, L is set to 21.

$$x[i]=1-\cos(i*\pi/((L-1)/2))*0.5, i=0,1,\ldots,L-1 \quad \text{[Equation 2]}$$

As a result, in [Equation 1], in the case of $(1-r)*x[i]$, since $1-r=0.073$ in the example of the ratio $r=0.927$, FIG. 3A is changed to FIG. 3B.

Finally, when the weight vector w[i] shown in [Equation 1] is expressed by using [Equation 2], the weight vector w[i] becomes a weight vector shown in [Equation 3]. An example of expressing [Equation 3] with a graph is FIG. 3C.

$$w[i] = 1 - \left(1 - \sqrt{t/p}\right)\left(1 - \cos\left(\frac{2\pi i}{L-1}\right)\right)*0.5,$$
$$i = 0, 1, \ldots, L-1 \quad \text{[Equation 3]}$$

As shown in [Equation 3] or FIG. 3C, the corresponding peak position is decreased to the signal magnitude threshold value (2.239 in the above example) and horizontal neighboring values, that is, values up to L/2 are gradually decreased to values between 0 and 1 around the signal peak position that exceeds the power threshold value t.

The corresponding peak position is decreased to the signal magnitude threshold value (2.239 in the above example) and the weight vector w[i] having bilateral symmetric values between 0 and 1 is calculated with respect to positions other than the center position and thereafter, a transmitter (e.g., a multiplying unit) multiplies the transmission signal by corresponding values of the weight vector w[i] by a predetermined length, that is, up to L/2 horizontally around the signal peak position that exceeds the power threshold value t and outputs the transmission signal multiplied by the corresponding values (S30).

For example, when a complex vector of the transmission signal is Tx and the signal peak position that exceeds the power threshold value t is k, multiplication is performed like $Tx[k-(L-1)/2+i]*w[i]$ with respect to Tx and k. Where, $i=0, 1, \ldots, L-1$.

Figure 4:
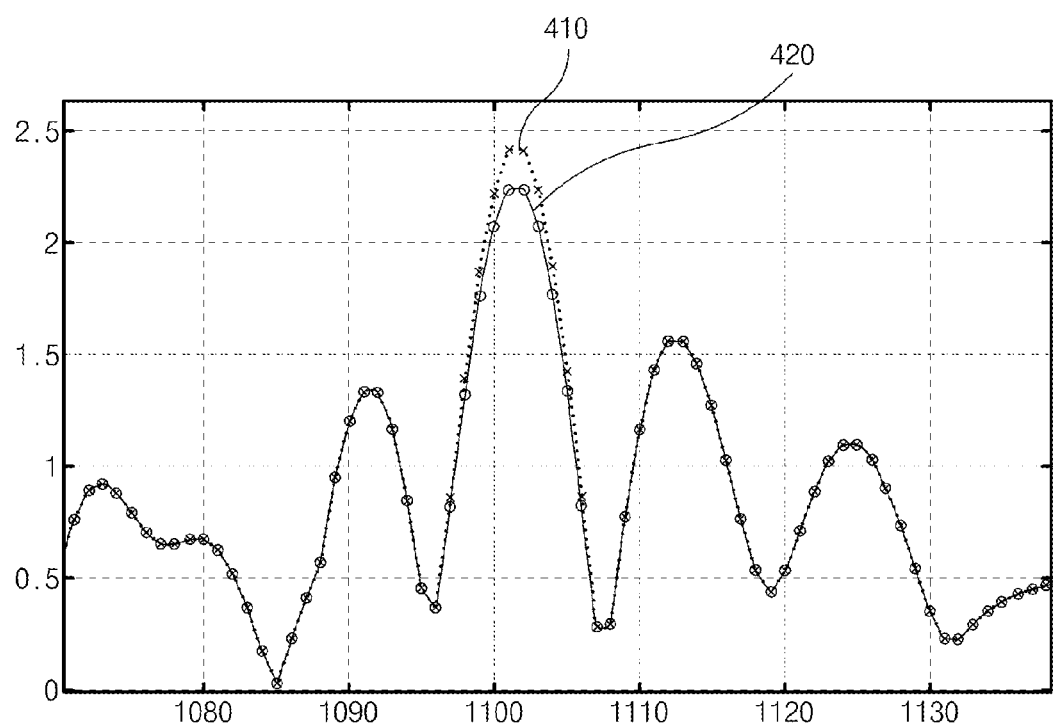
FIG. 4 is an exemplary diagram for reducing the PAPR with respect to a first peak of the transmission signal in the method for processing a transmission signal according to the exemplary embodiment of the present invention.

An example of a waveform of the transmission signal multiplied by the weight value around the signal peak position that exceeds the power threshold value t is illustrated in FIG. 4. As illustrated in FIG. 4, it can be seen that the magnitude of the signal peak position that exceeds the power threshold value t is decreased from 2.416 (see reference numeral 410 of FIGS. 4) to 2.239 (see reference numeral 420 of FIG. 4). Like the above example, 21 is used as the value of L.

Such a process is repeated sequentially with respect to all transmission signals of the transmission target OFDM signal block in the transmitter (S40). That is, after the corresponding transmission signal is multiplied by the corresponding values of the weight vector w[i] to be output, when the signal peak position that exceeds the power threshold value t is detected with respect to subsequent signals, a process that multiplies the transmission signal by the corresponding values of the weigh vector w[i] and output the transmission signal multiplied by the corresponding values by a predetermined length, that is, up to horizontally L/2 around the corresponding signal peak position after the weight vector w[i] is calculated is repeated. Steps S10 to S40 are similarly performed with respect to a subsequent signal block.

Figure 5:
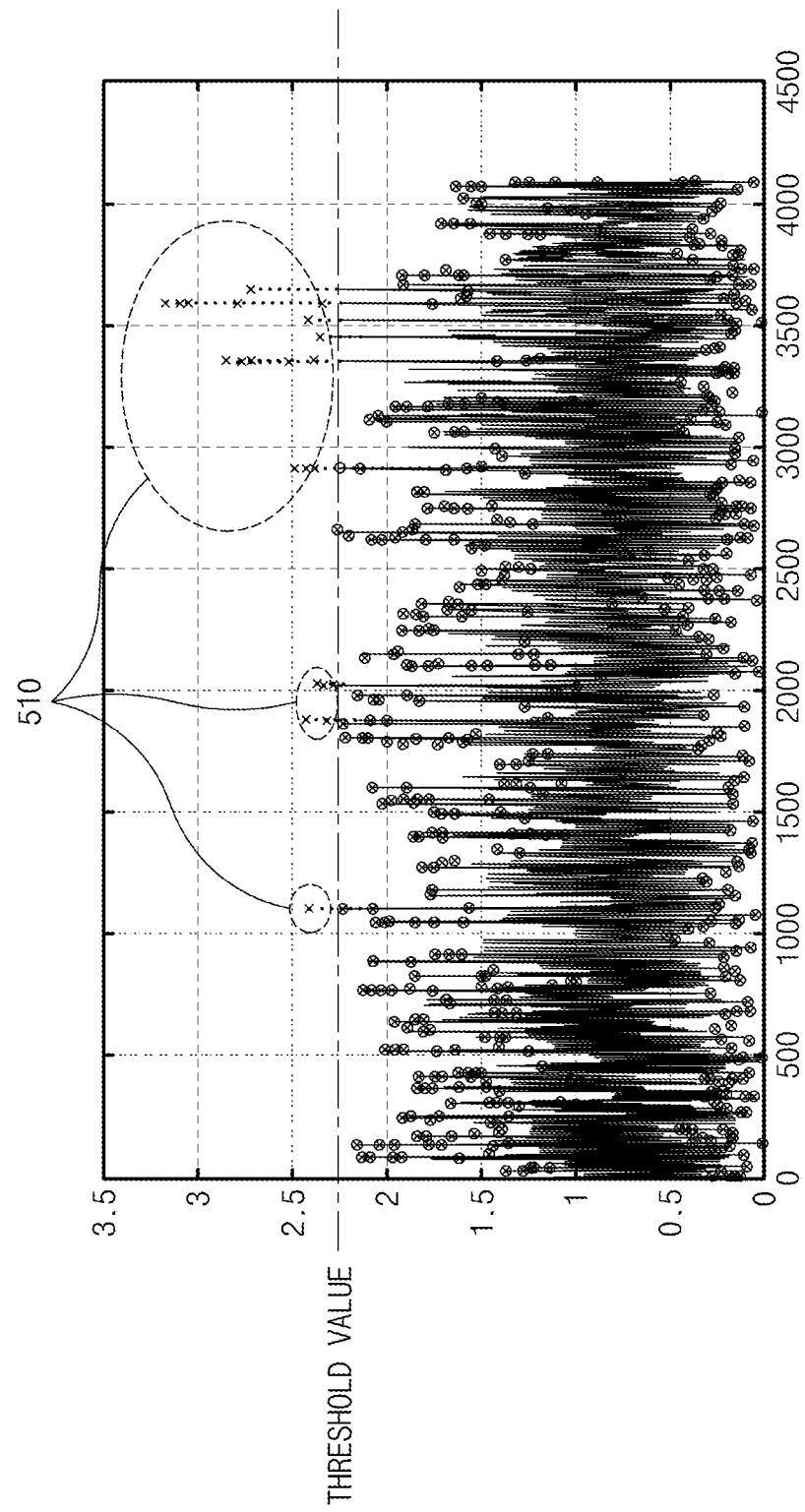
FIG. 5 is a diagram illustrating an example in which the PAPR reduction is performed with respect to an entire OFDM transmission signal having a predetermined length according to the exemplary embodiment of the present invention.

FIG. 5 is a diagram illustrating an example in which the PAPR reduction is performed with respect to an entire OFDM transmission signal having a predetermined length according to the exemplary embodiment of the present invention. As illustrated in FIG. 5, corresponding peak positions of signal peak positions 510 that exceed the power threshold value t are decreased to the signal magnitude threshold value (2.239 in the above example) by the weight vector w[i] and horizontal neighboring values of the corresponding peak positions, that is, values up to L/2 are gradually decreased. As a result, the target PAPR may be achieved.

It is very easy to implement the present invention by hardware. The reason is that signal processing is terminated by sequentially finding a predetermined peak value in the time region and multiplying values around the peak by a weight once. Finding the peak value is a simple operation using a comparator in terms of the hardware and multiplying the weight is also a simple multiplication process.

Calculating the weight may also be simply implemented as described below. In [Equation 3], $$\left(1 - \cos\left(\frac{2\pi i}{L-1}\right)\right)*0.5$$

part may be previously calculated and stored in a read only memory (ROM). $(1-\sqrt{t/p})$ A square root calculation for $(1-\sqrt{t/p})$ is performed, but if the threshold value t is previously determined, $(1-\sqrt{t/p})$ may be just made as a lookup table according to a p value. Therefore, w[i] may also be very simply implemented by using the ROM and storage means (the ROM, a RAM, and the like) storing the lookup table. Since the process of finding the peak and calculating the weight, and multiplying them is very simple, it is very easy to implement the process to operate sequentially and in real time.

Figure 6:
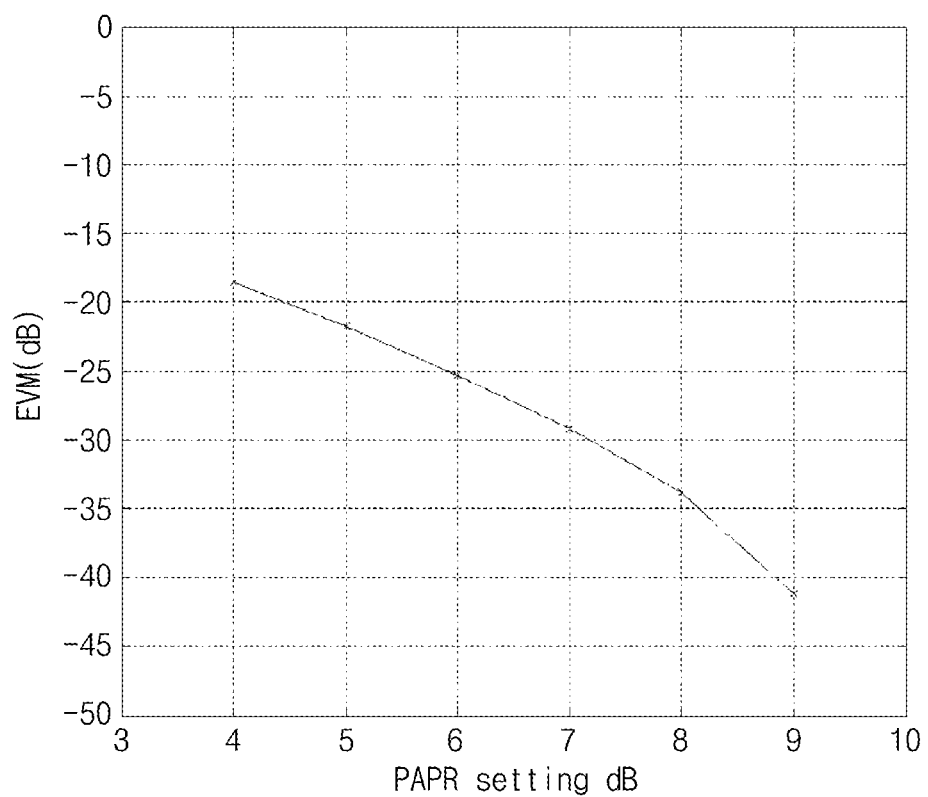
FIG. 6 illustrates an example of an error vector magnitude (EVM) after signal processing in the method for processing a transmission signal according to the exemplary embodiment of the present invention.

FIG. 6 illustrates an example of an error vector magnitude (EVM) after signal processing in the method for processing a transmission signal according to the exemplary embodiment of the present invention.

According to the exemplary embodiment of the present invention, EVM performance for measuring a difference between, after distortion of the transmission signal, the distorted transmission signal and an actual signal is measured. As the target PAPR decreases, the EVM increases.

When the length of the weight vector w[i] is 21 and the number of 01-DM subcarriers which may be constituted by multiple carriers or symbols is 8, if the PAPR is set to 4, 5, 6, 7, 8, and 9 dB, an EVM (dB) measurement result is illustrated in FIG. 6. That is, it can be seen that performance deterioration is very slight because the EVM of 3.4582%, that is, the EVM (dB) of approximately −29 dB is shown when the PAPR is set to 7 dB. For reference, 20*log 10(EVM) is performed in order to express the EVM dB.

Figure 7A:
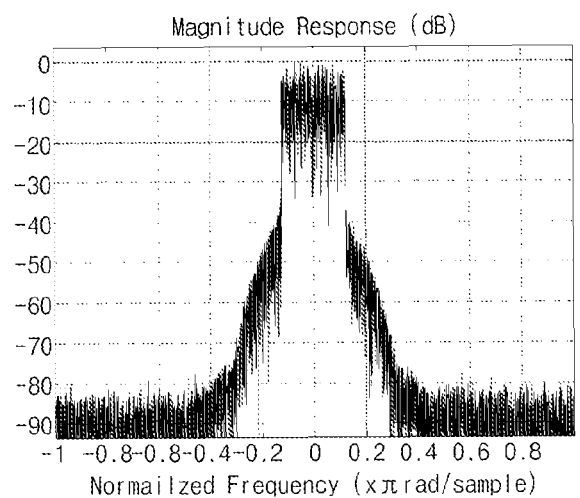
FIG. 7A, FIG. 7B, and FIG. 7C are illustrate examples of a spectrum shape in the signal processing in the method for processing a transmission signal according to the exemplary embodiment of the present invention.
Figure 7B:
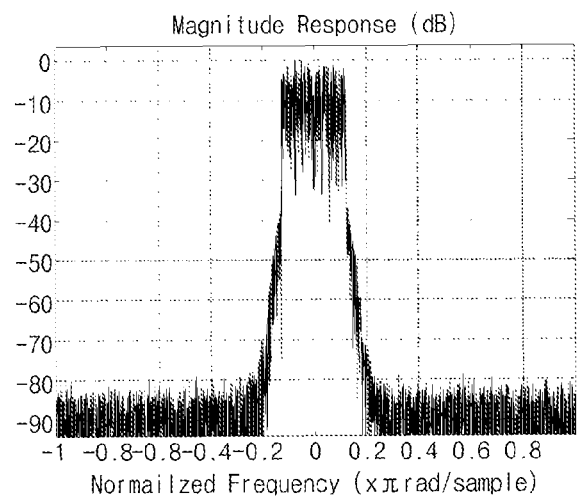
Figure 7C:
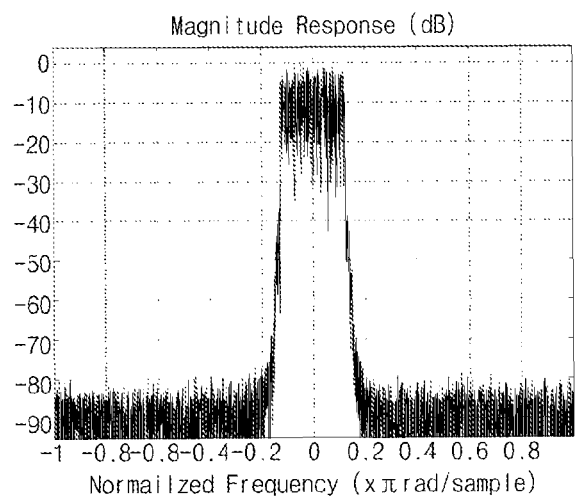

FIG. 7A, FIG. 7B, and FIG. 7C are illustrate examples of a spectrum shape in the signal processing in the method for processing a transmission signal according to the exemplary embodiment of the present invention.

Another performance index of the PAPR reduction method is how little out-of-band spectrum emission, that is, spurious occurs. Even good PAPR reduction method becomes an algorithm which may not be used if emission increases out of a given frequency band of a spectrum, that is, the spurious is large. The OFDM signal shown as above as an example less shows an effect of the length of the weight because the spurious emission is so large. Therefore, a spectrum characteristic of an FMT signal having a very small spurious signal will be described.

The given FTM signal has a total of 8 subcarriers and an interval between the respective subcarriers is 2.7 kHz. A protective band in each subcarrier is 0.3 kHz. As a band limitation filter of the FMT, a raised cosine filter in which a roll-off factor is 0.2 is used. FIG. 7A, FIG. 7B, and FIG. 7C illustrate spectrums depending on the length of the weight vector when the PAPR is limited to 7 dB.

In FIG. 7A, the weight length is set to 19. Herein, the length of one FMT symbol is 72. When the weight length is set to 19, the length of the weight is short, and as a result, the out-of-band emission is large. In FIG. 7B, the weight length is set to 55. The spurious decreases in some degree. In FIG. 7C, the weight length is set to 109. In FIG. 7C, it is illustrated that the out-of-band emission is very small. Therefore, the weight length needs to be determined according to a specification desired by the system.

As described above, according to exemplary embodiments of the present invention, in the method for processing a transmission signal for PAPR reduction in a time region, since a method is used, which reduces a peak value to an appropriate magnitude by appropriately distorting a final transmission signal for wireless communication just by using only a position of a subpeak over threshold power and a peak value, the present invention can be implemented by simple hardware having a small memory and a small operation amount and a signal can be effectively processed in real time and complicated hardware for processing a clipped signal itself or an error signal generated by clipping like the existing schemes is not required. Further, since a clipping scheme is not used in spite of operation in the time region, there is no filtering block and since the present invention can be applied to a final output signal in the time region, the present invention can be applied regardless of a modulation scheme and the present invention may be used while being mixed with another PAPR technique for signal processing in a frequency region, and the like, and as a result, the present invention can be applied to almost all systems. In addition, an influence of performance deterioration is almost never exerted on even demodulation performance and out-of-band emission can be sufficiently decreased by increasing a weight length, and as a result, there is small influence on occurrence of spurious in another band.

The present invention has been described by the specified matters and limited exemplary embodiments and drawings such as specific components, which are provided to help overall understanding of the present invention and the present invention is not limited to the exemplary embodiments, and those skilled in the art will appreciate that various modifications and changes can be made within the scope without departing from an essential characteristic of the present invention. The spirit of the present invention is defined while being limited to the exemplary embodiments described above and it should be appreciated that all technical spirits which are equivalent to or equivalently transformed from the appended claims in addition to the appended claims to be described beloware included in the claims of the present invention.

What is claimed is:

1. A method for processing a transmission signal in a time region in a transmitter for transmitting a signal for wireless communication, the method comprising:
   detecting a position of a signal peak that exceeds a power threshold value and a corresponding power value with respect to a transmission target input signal;
   calculating a weight vector by using a length of the weight vector and a ratio of the power threshold value to the power value of the signal peak; and
   multiplexing the transmission target input signal by respective corresponding values of the weight vector around the position of the signal peak, and outputting the transmission target input signal multiplied by the corresponding values.

2. The method of claim 1, further comprising:
   repeating the detection of the position of the signal peak and the corresponding power value, the calculation of the weight vector, and the multiplication process with respect to subsequent signals after the transmission target input signal and the weight vector are multiplied by each other.

3. The method of claim 1, wherein the weight vector has a value for decreasing power at the position of the signal peak to the power threshold value and a bilateral symmetric value between 0 and 1 around the position of the signal peak.

4. The method of claim 1, wherein the weight vector is determined according to:

$$w[i] = 1 - \left(1 - \sqrt{t/p}\right)\left(1 - \cos\left(\frac{2\pi i}{L-1}\right)\right) * 0.5,$$

$$i = 0, 1, \ldots, L-1,$$

wherein w is the weight vector, t is the power threshold value, p is the power value of the signal peak, and L is the length of the weight vector.

5. A transmitter for wireless communication, comprising: one or more processor configured to:
- detect a position of a signal peak that exceeds a power threshold value and a corresponding power value with respect to a transmission target input signal;
- calculate a weight vector by using a length of the weight vector and a ratio of the power threshold value to a power value of the signal peak; and
- multiplex the transmission target input signal by respective corresponding values of the weight vector around the position of the signal peak and output the transmission target input signal multiplied by the corresponding values.

6. The transmitter of claim 5, wherein the detection of the position of the signal peak and the corresponding power value, the calculation of the weight vector, and the multiplication are repeatedly performed with respect to subsequent signals after the transmission target input signal and the weight vector are multiplied by each other.

7. The transmitter of claim 5, wherein the weight vector has a value for decreasing power at the position of the signal peak to the power threshold value and a bilateral symmetric value between 0 and 1 around the position of the signal peak.

8. The transmitter of claim 5, wherein the weight vector is determined according to:

$$w[i] = 1 - \left(1 - \sqrt{t/p}\right)\left(1 - \cos\left(\frac{2\pi i}{L-1}\right)\right) * 0.5,$$
$$i = 0, 1, \ldots, L-1,$$

wherein w is the weight vector, t is the power threshold value, p is the power value of the signal peak, and L is the length of the weight vector.

* * * * *